(12) United States Patent
Gutierrez

(10) Patent No.: US 11,249,765 B2
(45) Date of Patent: Feb. 15, 2022

(54) PERFORMANCE FOR GPU EXCEPTIONS

(71) Applicant: Advanced Micro Devices, Inc., Santa Clara, CA (US)

(72) Inventor: Anthony T. Gutierrez, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 82 days.

(21) Appl. No.: 16/109,567

(22) Filed: Aug. 22, 2018

(65) Prior Publication Data

US 2020/0065113 A1 Feb. 27, 2020

(51) Int. Cl.
*G06F 9/30* (2018.01)
*G06F 9/38* (2018.01)
*G06T 1/20* (2006.01)

(52) U.S. Cl.
CPC ........ *G06F 9/3865* (2013.01); *G06F 9/30018* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 10,445,204 B2* | 10/2019 | O'Connor | ............. | G06F 9/3877 |
| 2013/0141446 A1* | 6/2013 | Hartog | .................... | G06F 12/10 |
| | | | | 345/522 |
| 2015/0378941 A1* | 12/2015 | Rozas | ..................... | G06F 13/24 |
| | | | | 710/267 |

OTHER PUBLICATIONS

Menon, J. et al., "iGPU: Exceception Support and Speculative Execution on GPUs", Proceedings of the 39th Annual International Symposium on Computer Architecture, Jun. 9-13, 2012, pp. 72-83, IEEE Computer Society, Portland Oregon, USA.

Rhu, M. et al., ". vDNN: Virtualized Deep Neural Networks for Scalable, Memory-Efficient Neural Network Design" Proceedings of the 49th IEEE/ACM International Symposium on Microarchitecture, Oct. 15-19, 2016, 13 pgs., Article No. 18, IEEE Press, Taipai, TW (downloaded from http://arxiv.org).

Zheng, T. et al, "Towards High Performance Paged Memory for GPUs", 2016 IEEE International Symposium on High Performance Computer Architecture, Mar. 12-16, 2016, pp. 345-357, IEEE, Barcelona, Spain.

(Continued)

Primary Examiner — Corey S Faherty
(74) Attorney, Agent, or Firm — Volpe Koenig (57) ABSTRACT

Techniques for improving performance of accelerated processing devices ("APDs") when exceptions occur are provided. In APDs, the very large number of parallel processing execution units, and the complexity of the hardware used to execute a large number of work-items in parallel, means that APDs typically stall when an exception occurs (unlike in central processing units ("CPUs"), which are able to execute speculatively and out-of-order). However, the techniques provided herein allow at least some execution to occur past exceptions. Execution past an exception generating instruction occurs by executing instructions that would not lead to a corruption while skipping those that would lead to a corruption. After the exception has been satisfied, execution occurs in a replay mode in which the potentially exception-generating instruction is executed and in which instructions that did not execute in the exception-wait mode are executed. A mask and counter are used to control execution in replay mode.

20 Claims, 5 Drawing Sheets

(56) References Cited

OTHER PUBLICATIONS

Tanasic, I. et al., "Efficient Exception Handling Support for GPUs", Proceedings of the 50th Annual IEEE/ACM International Symposium on Microarchitecture, Oct. 14-18, 2017, pp. 109-122, ACM, Cambridge, MA, USA.

* cited by examiner

PERFORMANCE FOR GPU EXCEPTIONS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Graphics processing units ("GPUs") are massively parallel computing devices that are useful for a wide variety of tasks. Programs executing on GPUs may include instructions that may result in a delay. One example is a memory instruction, which loads or stores data and refers to a virtual memory address. The time needed for translation of the address could potentially result in a delay. Another example of an exception is an arithmetic logic unit ("ALU") exception, such as a divide-by-zero exception, and a floating point underflow or overflow exception.

BRIEF DESCRIPTION OF THE DRAWINGS

A more detailed understanding may be had from the following description, given by way of example in conjunction with the accompanying drawings wherein.

DETAILED DESCRIPTION

Techniques for improving performance of accelerated processing devices ("APDs") when exceptions are enabled are provided. In APDs, the very large number of parallel processing execution units, and the complexity of the hardware used to execute a large number of work-items in parallel, means that APDs typically stall when an instruction that has the capacity to trigger an exception (an "exception-related instruction") occurs (unlike in central processing units ("CPUs"), which are able to execute speculatively and out-of-order). However, the techniques provided herein allow at least some execution to occur past exception-related instructions.

The techniques involve executing past an exception-related instruction in two passes, a first pass referred to herein as an "exception-wait pass" (or "exception-wait mode") and a second pass referred to herein as a "replay pass" (or "replay mode"). The techniques also involve analyzing the instructions after the exception-related instruction to determine which instructions should execute in which mode. This analysis may be done on-the-fly by the hardware that executes the instructions or by a compiler. In either case, a mask is generated and execution of the instructions is controlled based on the mask, which indicates which pass each individual instruction is to execute in. A counter is used to keep track of how many instructions have been executed past the exception-related instruction.

The analysis of which instructions should execute in which mode occurs as follows. For any particular instruction under analysis, that instruction executes in the exception-wait pass unless one of the following is true: the instruction writes to a register that is read by a prior instruction that must execute in the replay mode (note, the exception-related instructions must execute in the replay mode); the instruction writes to a register that is also written to by a prior instruction that must execute in replay mode (i.e., to prevent out-of-order register writes); or the instruction has a data dependency on a prior instruction that must execute in the replay mode (e.g., the instruction reads from a register that a prior instruction that must execute in the replay mode writes to). If any of the above are true, then the instruction must execute in the replay mode. Information indicating whether an instruction is to execute in the replay mode is written to a mask, which is used to control execution in the replay mode.

During execution, an exception-related instruction is executed or issued (where "issued" means the execution of the instruction can no longer be presented, unless another exception-related instruction was issued earlier and does trigger an exception) and exception-wait mode is initiated. An "exception-related instruction" is an instruction that has the potential for generating an exception. An example is a memory access instruction, which triggers an exception if the translation from the virtual address specified by the instruction to a physical address is not found in a translation lookaside buffer ("TLB"). If such an exception is generated, the exception is considered handled when the translation is returned from a page table to the functional unit executing the memory instruction.

The exception-wait mode continues until it is determined that no exception will occur, until the exception is serviced if an exception does occur, or until execution stalls for another reason, such as due to reaching an instruction that requires stalling. During the exception-wait mode, instructions that can execute in that mode are executed, and instructions that cannot execute in that mode are skipped. The number of instructions encountered, including both those that are executed in the exception-wait mode, and those that cannot, is tracked in a counter. When exception-wait mode ends, the exception-related instructions are replayed, the instructions that did not execute in exception-wait mode are executed, and the instructions that did execute in exception-wait mode are skipped. The counter is decremented for each instruction executed or skipped in the replay mode. When the counter reaches zero, the replay mode ends and normal execution resumes.

In an alternative implementation, instead of skipping instructions in the execution wait mode, the first instruction that would be skipped instead causes execution to stall. Execution resumes when it is determined whether the exception-related instruction actually generates an exception. If no exception is generated, then the stalled instruction simply resumes and no replay occurs. If an exception is generated, then the exception is handled and the exception-related instruction is replayed. The instructions that executed in the exception-wait mode are skipped (per the mask) and the instruction that was stalled is also replayed. After the instruction that was stalled is executed, execution resumes as normal.

The above technique allows at least some instruction execution to occur past an exception-related instruction that would otherwise cause APD execution to stall. Instructions that would not corrupt execution are allowed to execute, while those that would corrupt execution are skipped until a replay mode, at which point those instructions are executed.

Figure 1:
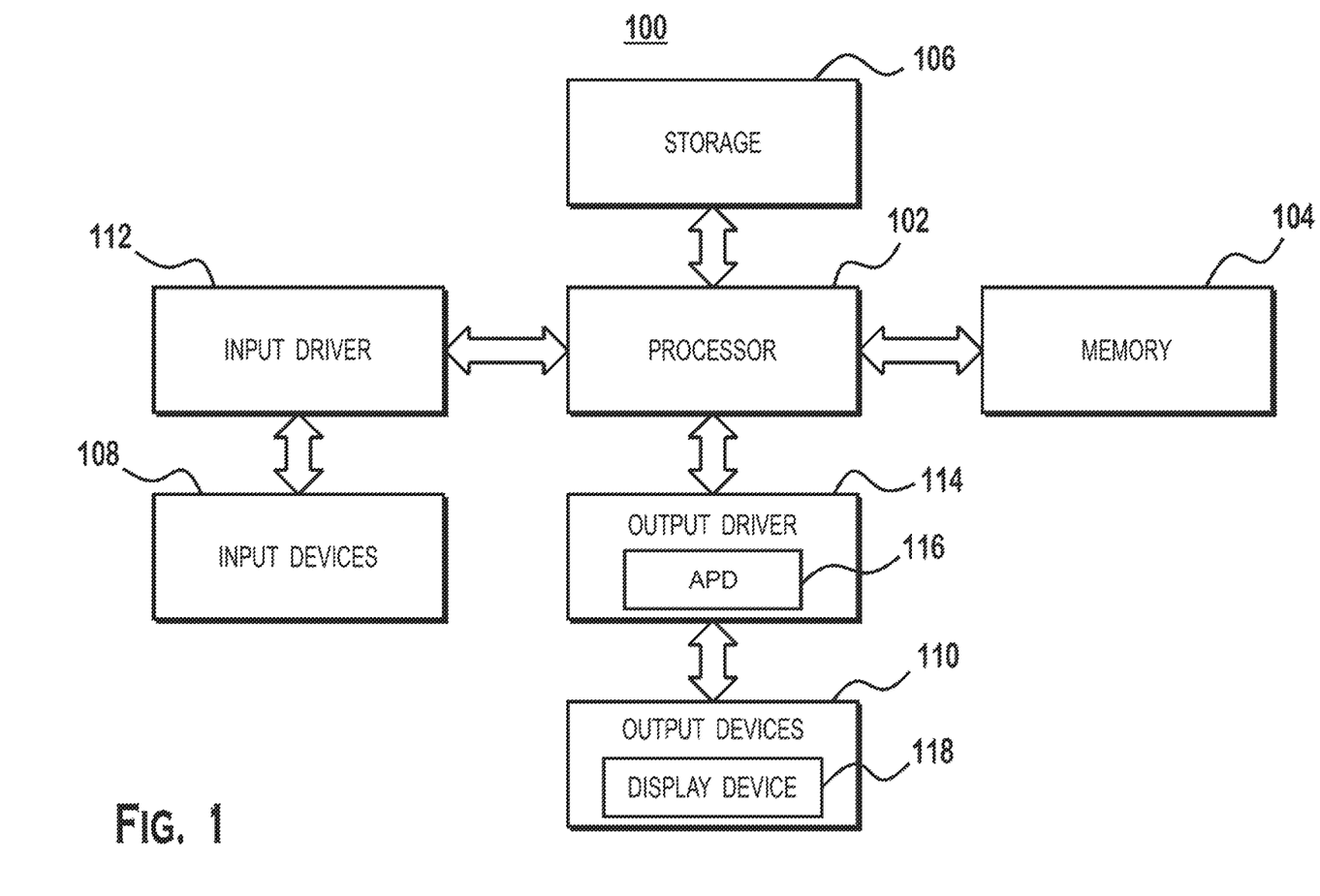
FIG. 1 is a block diagram illustrating details of a computer system, according to an example.

FIG. 1 is a block diagram illustrating details of a computer system 100 in which aspects of the present disclosure can be implemented, according to an example. The computer system 100 includes, for example, a computer, a gaming device, a handheld device, a set-top box, a television, a mobile phone, or a tablet computer. The computer system 100 includes a processor 102, a memory 104, a storage device 106, one or more input devices 108, and one or more output devices 110. The computer system 100 also includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display. The techniques described herein could also be performed by an APD 116 that does not have graphics rendering capability.

Figure 2:
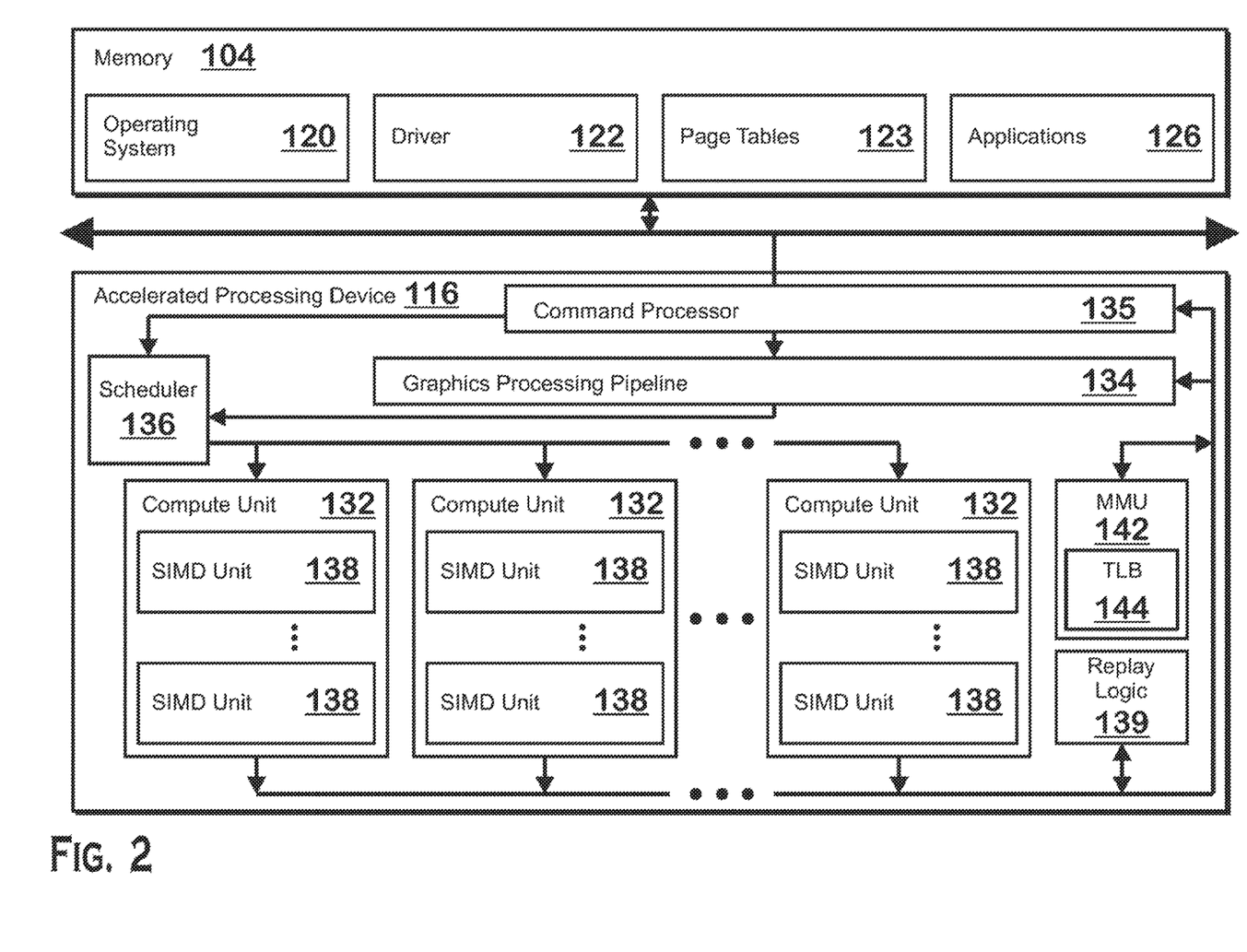
FIG. 2 is a block diagram of the computer system of FIG. 1, illustrating additional details related to the accelerated processing device, according to an example.

FIG. 2 is a block diagram of the computer system 100, illustrating additional details related to the APD 116, according to an example. The processor 102 maintains, in system memory 104, one or more control logic modules for execution by the processor 102. The control logic modules include an operating system 120, a driver 122, and applications 126, and may optionally include other modules not shown. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 also includes a compiler that compiles shader code into shader programs for execution by processing components (such as the SIMD units 138 discussed in further detail below) of the APD 116. A command processor 135 receives commands from the processor 102 (or other source) and executes those commands on the APD 116. The commands include, without limitation, commands to perform graphics rendering tasks using the graphics processing pipeline 134, or commands to execute shader programs on the compute units 132 via the scheduler 136.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, machine-learning-like application such as block chain, crypto-applications, convolutional neural network applications, deep neural network applications, or other tasks, based on commands received from the processor 102 or that are not part of the "normal" information flow of a graphics processing pipeline, or that are completely unrelated to graphics operations (sometimes referred to as "GPGPU" or "general purpose graphics processing unit").

The APD 116 includes compute units 132 (which may collectively be referred to herein as "programmable processing units") that include one or more SIMD units 138 that are configured to perform operations in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed. Predication may be used for other purposes as well, such as to prevent scalar instructions from executing, or for other reasons. In addition to the SIMD units 138, the compute units 132 include other units not shown, such as vector memory, scalar memory, scalar arithmetic logic units ("ALUs"), vector ALUs (e.g., SIMD, vector units, etc.), control flow units, and other units not shown.

The basic unit of execution in compute units 132 is a work-item. Each work-item represents a single instantiation of a shader program that is to be executed in parallel in a particular lane of a wavefront. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). A scheduler 136 is configured to perform operations related to scheduling various wavefronts on different compute units 132 and SIMD units 138. Each particular work group is scheduled to a particular compute unit 132, so that different wavefronts for a single work group are scheduled on the same compute unit 132.

The parallelism afforded by the compute units 132 is suitable for graphics related operations such as pixel value calculations, vertex transformations, tessellation, geometry shading operations, and other graphics operations. A graphics processing pipeline 134 which accepts graphics processing commands from the processor 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs," which may be compiled by the driver 122) that define such computation tasks to the APD 116 for execution. Although the APD 116 is illustrated with a graphics processing pipeline 134, the teachings of the present disclosure are also applicable for an APD 116 without a graphics processing pipeline 134.

Instructions that execute on the APD 116 may access memory. Such accesses are typically made via addresses that require translation (e.g., virtual address-to-physical address translation). Page tables 123, which are shown stored in system memory 104 (although they could be partially or fully stored in a different memory), store such translations. A memory management unit ("MMU") 142 services address translations for the APD 116. A translation lookaside buffer ("TLB") 144 caches these translations for quick access. The MMU translates addresses by first checking the TLB to determine whether the translation is stored there and if not, checking for other locations such as the page tables 123 for the translations.

Because address translations typically take more time than the time it takes to execute a single instruction, in some implementations, a SIMD unit 138 stalls execution while waiting for address translations to be returned. Typically, this stalling occurs after a collection of memory access instructions referred to herein as a "memclause" has been executed. This memclause is generally created by the compiler when compiling programmer-created shader programs. Specifically, the compiler typically groups memory access instructions together to hide address translation and memory access latency. If the TLB does not store a requested translation, then an exception is considered to have been triggered and once translations are returned the memory access instructions are replayed with the translated addresses. If the TLB does store a request translation, the execution unit stalls the memory access instructions until the translation is returned and then continues executing.

Techniques are disclosed herein to reduce or eliminate the stalling that occurs when waiting for address translations to be returned. Generally, these techniques function by allowing instructions after the memclause to execute, rather than stalling. A mechanism exists to differentiate between instructions that would result in incorrect execution if executed before the replay of the memclause instructions and other instructions that would be replayed, and instructions that would not result in incorrect execution if executed before the replay of those instructions. In a first pass, referred to herein as "exception wait mode," the SIMD unit 138 executes the instructions that have been identified as resulting in correct execution if executed before the memclause instructions. Once the translations have been returned, the SIMD unit 138 executes in a "replay mode," executing the instructions that were not executed in the exception wait mode, and skipping the instructions that were executed in the exception wait mode. Additional details follows.

Figure 3:
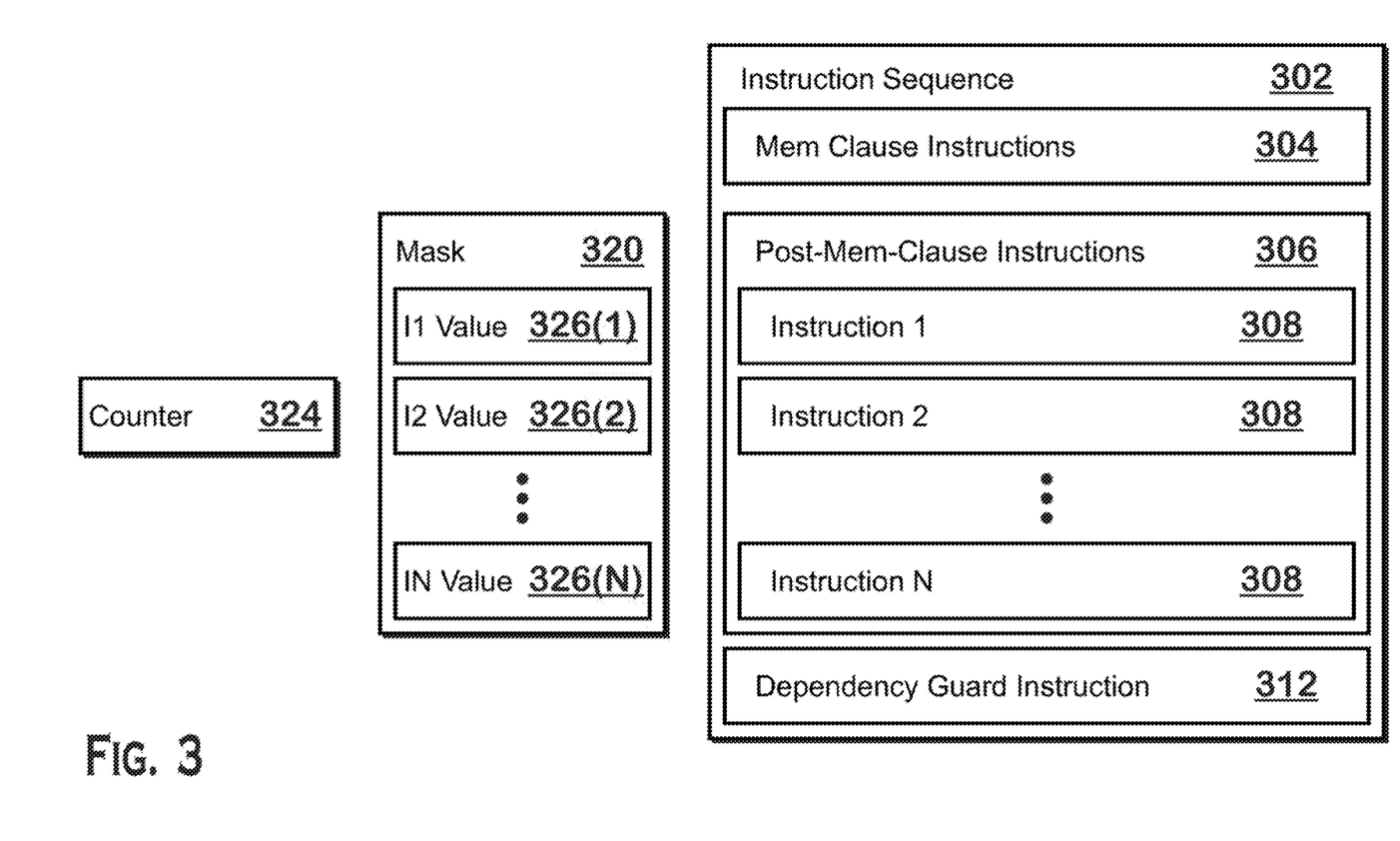
FIG. 3 illustrates aspects of a technique for allowing instruction execution to proceed past memory access instructions in an accelerated processing device while waiting for translations to be returned, according to an example.

FIG. 3 illustrates aspects of a technique for allowing instruction execution to proceed past memory access instructions in an APD while waiting for translations to be returned, according to an example. An instruction sequence 302 is shown. In addition, a mask 320 and a counter 324 are shown. The memory access instructions, shown as "mem clause instructions 304" in FIG. 3, are specific examples of exception-related instructions. It should be understood that the techniques provided herein can be used for exception-related instructions other than memory access instructions.

The instruction sequence 302 includes the mem clause instructions 304. The mem clause instructions 304 together are a "memclause" that includes one or more consecutive memory access instructions. Each memory access instruction accesses memory in some way via a virtual address that requires translation to a physical address. When a SIMD unit 138 executes any particular memory access instruction of the memclause, the SIMD unit 138 requests address translation from the MMU 142. While waiting for the address translations to be returned, the SIMD unit 138 executes zero or more post-mem-clause instructions 306 based on the mask 320. The mask 320 indicates whether any particular post-mem-clause instruction is executed in the exception wait mode or the replay mode. The mask 320 may be generated before execution of the instruction sequence 302, by, for example, a compiler within the driver 122. The mask 320 may alternatively be generated on the fly by the SIMD unit 138 (or other component of the APD 116) during execution. The mask 320 and counter 324 are maintained in shared components of the compute unit 138. An explanation of how the mask 320 is generated is now provided.

Generally, instructions have a read set and a write set. The read set includes registers used as input to the instruction and the write set includes registers to which the instruction writes. It is of course possible for some instructions to have only a read set or only a write set. Determining whether a particular instruction should execute in exception wait mode or in replay mode is made by analyzing the read sets and write sets of the instructions. More specifically, for any subject post-mem-clause instruction 306, if that subject instruction includes a register in its write set that is the same as the register in the read set or write set of any instruction that 1) is prior to the subject instruction in program order; 2) is to execute in the replay mode (including the mem clause instructions 304); and 3) is part of the instruction sequence 302 (i.e., is either a mem clause instruction 304 or a post-mem-clause instruction 306), then the subject instruction itself is also to be executed in the replay mode. In addition, any instruction that has a data dependency on an instruction that is to be executed in replay mode also is to be executed in replay mode. The mask 320 includes mask values 326 that each indicates whether a corresponding post-mem-clause instruction 308 is to execute in the exception wait mode or in the replay mode.

An example illustrating populating the mask 320 using a sequence of pseudo assembly instructions will now be provided.

Pseudo-Assembly Instruction Sequence

TABLE 1

Pseudo code sequence illustrating mask generation load v6, v[10:11]
load v0, v[2:3]
mul v4, v1, 12
mul v5, v1, 12
add v2, 4, v1
add v8, v2, v1
add v9, 8, v5

In the instruction sequence of table 1, the memclause includes the instruction "load v6, v[10:11]" and the instruction "load v0, v[2:3]." The instruction "load v6, v[10:11]" loads the value at the memory address specified by the value in register v2 appended to the value in register v7 and places the loaded value into register v6. The instruction "load v0, v[2:3] loads the value at the memory address specified by the value in register v10 appended to the value in register v11 and places the loaded value into register v0. The instruction "mul v4, v1, 12" multiples 12 by the value in v 1 and places the result in register v4. The instruction "mul v5, v1, 12" multiples 12 by the value in v1 and places the result in register v5. The instruction "add v2, 4, v1" adds 4 to the value in v 1 and places the result in v2. The instruction "add v8, v2, v1" adds the values in v2 and v1 together and places the result in v8. The instruction "add v9, 8, v5" adds the value in v5 to 8 and places the result in v9.

The memclause instructions will execute in the replay mode, by virtue of those instructions being exception-related instructions that are replayed. The "mul v4, v1, 12" instruction will be able to execute in the exception wait mode because the write set, which is register v4, is not part of the read set or write set of either of the memclause instructions, and because the mul instruction is not dependent on either of the loaded values. The "mul v5, v1, 12" instruction can also be executed in the exception wait mode because the write set, register v5, is not used by any of the memclause instructions. The "add v2, 4, v1" will not be able to execute in the exception wait mode because the write set of that instruction includes v2, which is in the read set of a previous instruction that is to execute in the replay mode. Specifically, both load instructions of the memclause instructions load data using the value in the v2 register. If the add instruction were to write to this register and then the memclause instructions were replayed, those instructions would load values from the wrong address (unless the address written by the write instruction serendipitously was the same as the value that "should" have been accessed by the memclause instructions).

The "add v8, v2, v1" instruction also is to execute in replay mode rather than in exception wait mode. More specifically, although this instruction does not write to any register used in a prior instruction that is to execute in the replay mode, this instruction has a data dependency on a prior instruction that is to execute in the replay mode. Specifically, the prior add instruction writes to v2, which is read by the "add v8, v2, v1" instruction.

The "add v9, 8, v5" instruction is able to execute in exception wait mode. The write set of this instruction is not used in the read set or write set of any instruction that is to execute in replay mode. Further, this instruction has no data dependencies on prior instructions that are to execute in replay mode. The data dependency of this instruction is on the "mul v5, v1, 12" instruction, which executes in the exception wait mode, not the replay mode.

As described above, the above analysis, including analyzing read sets and write sets as well as data dependencies, is used to generate the mask 320, which may be created on the fly during run time (e.g., during the exception-wait mode itself) or by a compiler, which is responsible for tracking instruction dependencies and assigning registers to instructions at compile time.

A dependency guard instruction 312 exists after the post-mem-clause instructions 306. The purpose of the dependency guard instruction 312 is to prevent execution past that instruction while waiting for the actual data operations of the mem clause instructions 304 to complete. For example, if the mem clause instructions 304 include one or more load instructions, then when the SIMD unit 138 arrives at the dependency guard instruction 312 and the data for the load instruction(s) has not yet arrived, the SIMD unit 138 stalls until the data has arrived so that instructions subsequent to the dependency guard instruction 312 that are dependent on that data may execute correct.

A counter 324 is present to keep track of how far into the post-mem-clause instructions 306 execution has proceeded before the exception has been handled. This counter 324 thus allows the SIMD unit 138 to know which instructions are to be executed in the replay mode due to not having been executed in the exception wait mode and which instructions that executed in the exception wait mode do not need to execute in the replay mode.

Figure 4:
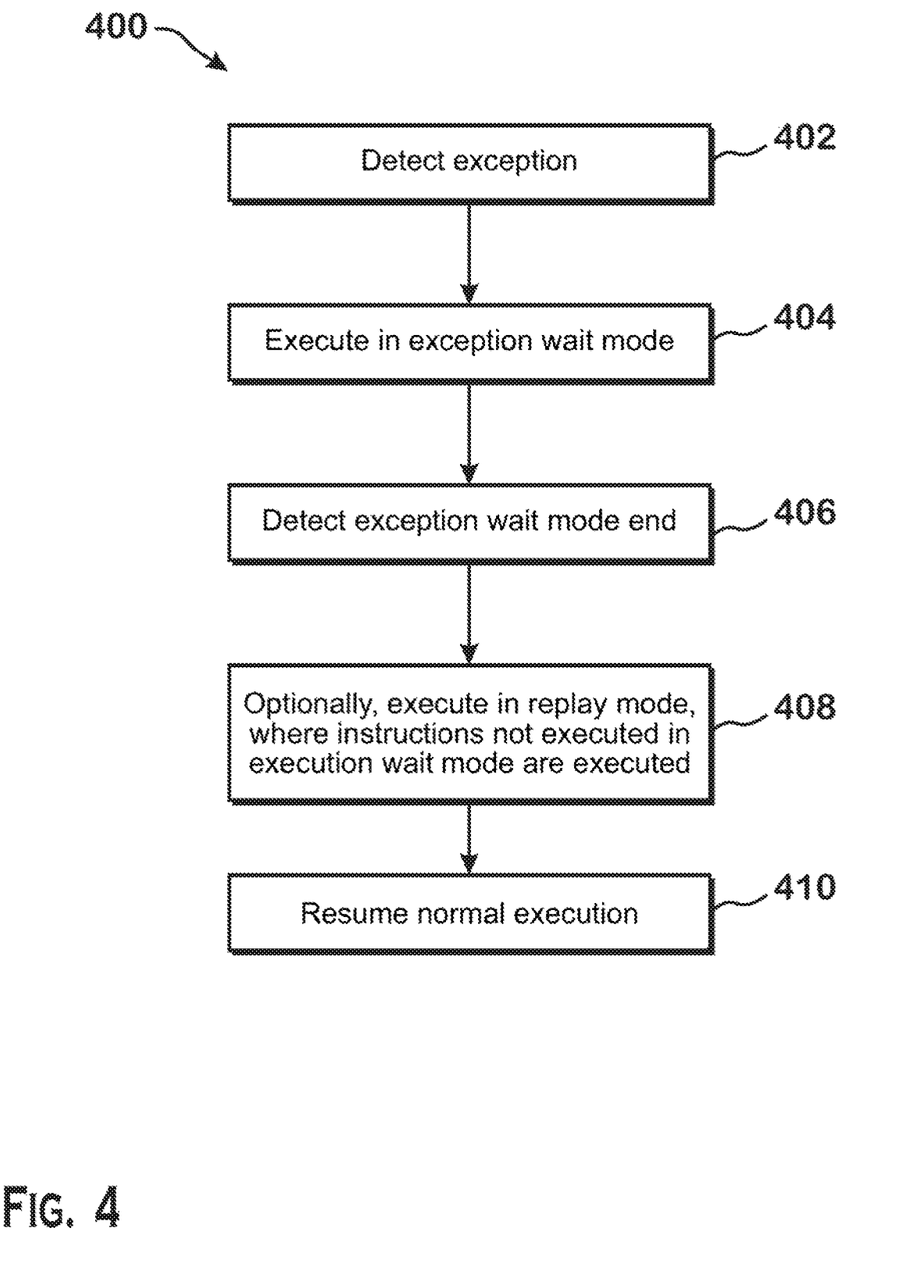
FIG. 4 is a flow diagram of a method for executing in a two-pass mode following an exception.
Figure 5A:
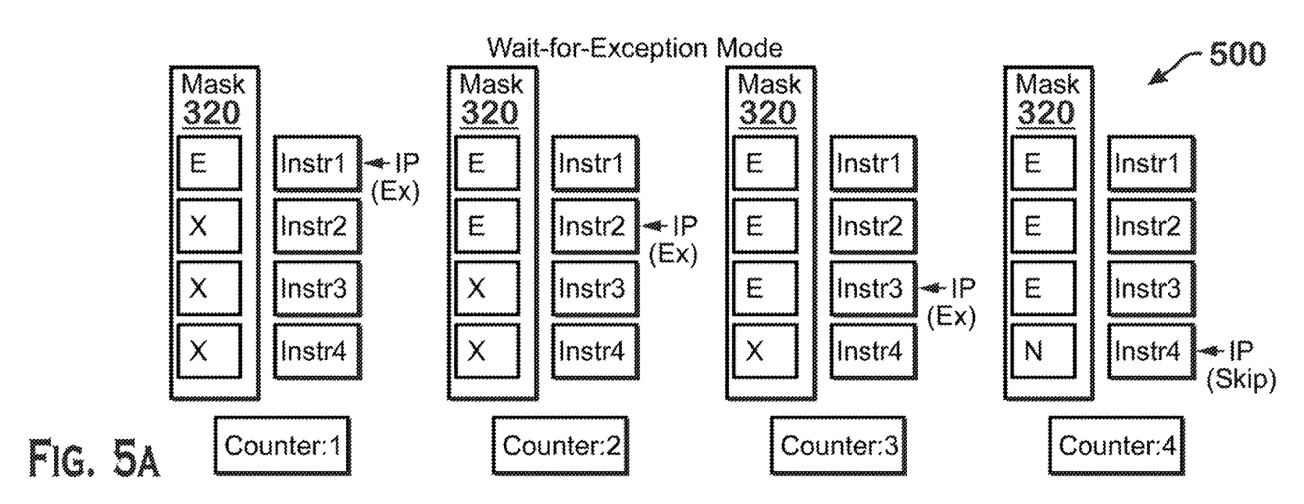
FIGS. 5A-5B illustrate examples of execution in the two-pass mode described with respect to FIG. 4.
Figure 5B:
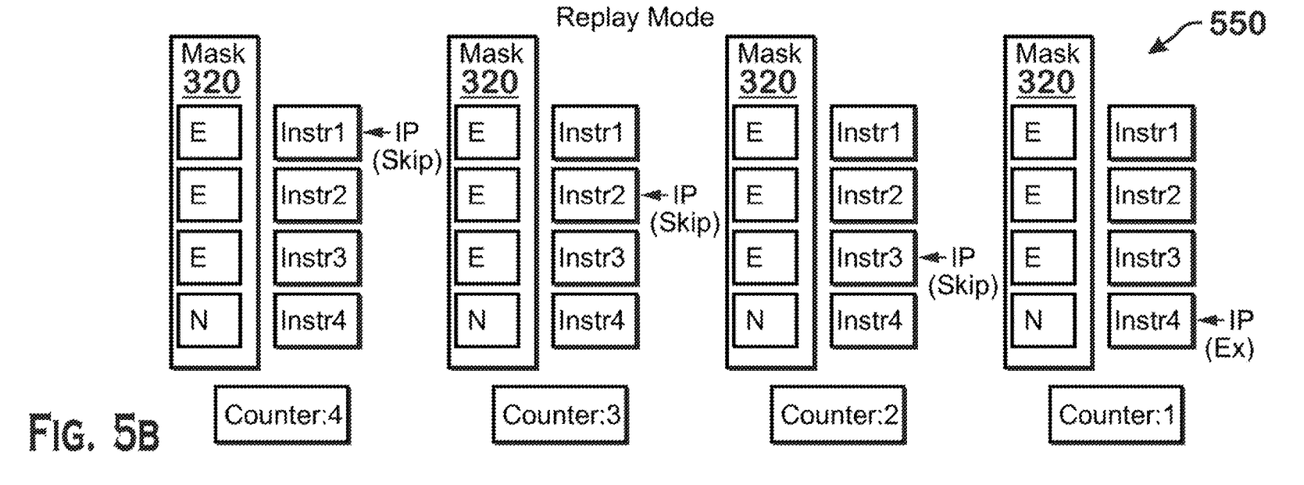

Operation according to the two-pass scheme including both the exception wait mode and the replay mode is now described with reference to FIGS. 4 and 5A-5B together. FIG. 4 is a flow diagram of a method 400 for executing in a two-pass mode following an exception and FIGS. 5A-5B illustrate examples of execution in the two-pass mode described with respect to FIG. 4. Although described with respect to the system of FIGS. 1 and 2, those of skill in the art will understand that any system configured to perform the method 400 in any technically feasible order falls under the scope of the present disclosure.

As shown, the method 400 begins at step, where the SIMD unit 138 detects an event having the potential to trigger an exception. In the example described above, the exception is the failure of a TLB to be able to translate one or more memory addresses used by one or more memory access instructions of a memclause, meaning that a page fault handler must first find the location of the translation and send the translation back to the TLB, but it is possible in other examples for the exception to be a different type of exception. In FIGS. 5A and 5B, the exception-related instruction is not shown. The first instruction ("Instr1") is the first instruction after the end of the instruction or instructions that have the potential to generate the exception. Where there are multiple exception-related instructions, such as with a memclause, "Instr1" represents the first instruction after the last memory access instruction of the memclause.

At step 404, the SIMD unit 138 executes in exception wait mode, allowing certain instructions to execute based on the mask 320. If the mask is generated on the fly, then the mask may be generated during the exception-wait mode while executing the instructions. If the mask is generated before execution, by, for example, a compiler, then the mask is loaded by an instruction into a mask register and is used to control execution in the exception-wait mode and the replay mode. Regardless of when created, the mask 320 is generated as described elsewhere herein.

Execution in the exception-wait mode includes executing the instructions in sequence (e.g., as specified by a shader program), according to the mask 320. If the mask indicates that an instruction cannot be executed in exception-wait mode, then that instruction is not executed in exception-wait mode. If the mask indicates that an instruction can be executed in exception-wait mode, then that instruction is executed in exception-wait mode. The counter is incremented for each instruction skipped or executed.

FIG. 5A illustrates execution in the exception-wait mode. FIG. 5A includes four portions, each of which has the instruction pointer ("IP") pointing to a different instruction. Mask 320 indicates (with the letter "E") that instruction 1 can execute in exception-wait mode, and thus the SIMD unit 138 executes this instruction. In executing this instruction, the SIMD unit 138 increases the counter by 1. The mask 320 also indicates that instructions 2 and 3 can execute in the exception-wait mode, so the SIMD unit 138 executes those instructions and increments the counter by 1 for each such instruction. The mask 320 indicates that instruction 4 cannot be executed in exception-wait mode (with the letter "N"), so the SIMD unit 138 skips that instruction, but still increments the counter. The letter "X" indicates that the value for the mask 320 may not yet have been generated.

At step 406, the SIMD unit 138 detects the exception-wait mode end. In FIG. 5A, this occurs after instruction 4 is skipped and thus when the counter is at 4. In the example exception of waiting for an address translation, the exception-wait mode ends when the translation has been received by the SIMD unit 138. Execution in the exception-wait mode may also end when the SIMD unit 138 stalls for another reason, such as arriving at the dependency guard instruction 312.

Once the exception-wait mode ends, at step 408, the SIMD unit 138 executes in replay mode at step 408. Replay mode includes replaying the exception-related instructions (which are, using the example of memory access instructions, the mem clause instructions). Once the exception-related instructions are replayed, the SIMD unit 138 uses the mask 320 and the counter to execute instructions that were not executed in the exception wait mode. Specifically, the SIMD unit 138 sequences through the instructions subsequent to the exception-related instructions, decrementing the counter for each instruction executed or skipped. In this mode, the SIMD unit 138 executes instructions that were not executed in exception-wait mode according to the mask 320 and skips instructions that were executed in exception-wait mode according to the mask 320. In FIG. 5B, the mask 320 is shown with the same values as in FIG. 5A. The instruction pointer advances through the instructions as the counter is decremented. In the example shown, only instruction 4 is executed as that was the only instruction that was skipped in exception-wait mode. At step 410, replay mode ends. Replay mode ends when the counter reaches 0. Normal execution is resumed at that point.

In an alternative implementation, which represents a slight modification to the description provided above, the exception-wait mode involves stalling an instruction instead of skipping that instruction. The stalling occurs until the exception-wait mode ends at step 406. If the exception-wait mode is ended by it being determined that an exception did not occur (e.g., a translation is returned from the TLB for instructions that require address translation), then execution simply resumes normally (step 410) at the stalled instruction and the replay mode is not triggered (i.e., step 408 is not executed). If the exception-wait mode is ended by it being determined that an exception did occur (e.g., a translation is not returned from the TLB and thus the exception-related instruction must be replayed), then replay mode is performed. In this instance, replay mode is entered at step 408. Specifically, the exception-related instruction is replayed, the instructions that were executed in the exception-wait mode are skipped (according to the mask), and the instruction that was stalled is replayed. After the instruction that was stalled is replayed, replay mode ends and normal execution resumes (step 410).

The above techniques provide improved performance for APDs after exceptions by allowing at least some instructions after exception-related instructions to execute. In traditional techniques, on APDs, many exception-related instructions would simply cause execution in the SIMD unit 138 to stall. On CPUs, instructions may complete out of order and speculatively so that instructions that trigger exceptions do not require all execution to stall. Further, speculative execution on CPUs can be "corrected" upon detection that the speculative execution resulted in improper execution, by restoring the CPU pipeline to a checkpointed state. However, traditional APDs do not have this capability, as APD state is much more complex than CPU state. The techniques provided herein allow execution to proceed past exception-related instructions to at least some degree in APDs, thereby reducing the inefficiencies caused by stalling while waiting for exceptions to complete and improving performance.

It should be understood that although a particular example of an exception—waiting for address translations—has been described, the teachings herein may be applied to other types of exceptions. In such situations, in an exception-wait mode, instructions after the exception-related instructions would be executed if possible according to the mask 320 until the exception has been handled or until a condition that causes the SIMD unit 138 to stall until the exception is handled occurs (which, for the memory address translation example, is the dependency guard instruction 312). In the replay mode, instructions not executed in the exception-wait mode would be executed.

It should be understood that although SIMD units 138 are described as performing the operations described herein, any execution unit, whether a part of the APD 116 or external to the APD 116, could perform the operations described herein.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for executing instructions, comprising:
   identifying a first instruction capable of triggering an exception;
   detecting execution of the first instruction;
   detecting one or more instructions following, in program order, the first instruction;
   after the detection of the execution of the first instruction, executing a first subset of the one or more instruction in an exception-wait mode, and skipping a second subset of the one or more instructions, the second subset of the one or more instructions comprising a set of skipped instructions that would corrupt execution;
   detecting an end to the exception-wait mode;
   executing the set of skipped instructions in a replay mode; and
   resuming normal execution,
   wherein the first instruction does not trigger an exception.

2. The method of claim 1, wherein executing the first subset of the one or more instructions in the exception-wait mode includes incrementing a counter for each instruction executed or skipped.

3. The method of claim 2, wherein executing in the replay mode includes decrementing the counter for each instruction executed or skipped in the replay mode, and the replay mode ends when the counter is zero.

4. The method of claim 1, wherein exception-wait mode ends upon executing an instruction that causes execution to stall.

5. The method of claim 4, wherein the instruction that causes the execution to stall comprises a dependency guard instruction.

6. The method of claim 1, wherein exception-wait mode ends upon detecting that either no exception is generated by the first instruction or that an exception generated by the instruction has been satisfied.

7. The method of claim 1, wherein execution in the replay mode occurs according to a mask.

8. The method of claim 7, further comprising generating the mask in the exception-wait mode.

9. The method of claim 7, wherein the mask is generated offline by a compiler.

10. The method of claim 1, further comprising:
    during exception-wait mode, upon detecting an instruction that would corrupt execution, stalling execution at the instruction that would corrupt execution.

11. The method of claim 10, wherein:
    detecting an end to the exception-wait mode comprises detecting that the instruction does not trigger an exception; and
    resuming normal execution comprises responsive to the detecting, resuming execution with the stalled instruction.

12. A computing device for executing instructions, the computing device comprising:
    an execution unit; and
    replay logic,
    wherein the execution unit is configured to:
      identify a first instruction capable of triggering an exception,
      detect execution of the first instruction,
      detect one or more instructions following, in program order, the first instruction,
      after the detection of the execution of the first instruction, execute a first subset of the one or more instructions in an exception-wait mode, and skip a second subset of the one or more instructions, the second subset of the one or more instructions comprising a set of skipped instructions that would corrupt execution;
      detect an end to the exception-wait mode,
      execute the set of skipped instructions in a replay mode; and
      resume normal execution,
      wherein the first instruction does not trigger an exception.

13. The computing device of claim 12, wherein executing the first subset of the one or more instructions in the exception-wait mode includes incrementing a counter for each instruction executed or skipped.

14. The computing device of claim 13, wherein executing in the replay mode includes decrementing the counter for each instruction executed or skipped in the replay mode, and the replay mode ends when the counter is zero.

15. The computing device of claim 12, wherein the execution unit is further configured to:
    during exception-wait mode, upon detecting an instruction that would corrupt execution, stall execution at the instruction that would corrupt execution.

16. The computing device of claim 15, wherein:
    detecting an end to the exception-wait mode comprises detecting that the first instruction does not trigger an exception; and
    resuming normal execution comprises responsive to the detecting, resuming execution with the stalled instruction.

17. The computing device of claim 12, wherein execution in the replay mode occurs according to a mask.

18. The computing device of claim 17, wherein the execution unit is further configured to generate the mask in the exception-wait mode.

19. The method of claim 1, wherein:
    during the replay mode, instructions of a first type are executed, instructions of a second type are executed, and instructions of a third type are executed;
    an instruction of the first type comprises an instruction that writes to a register read from by an instruction prior to the instruction of the first type;
    an instruction of the second type comprises an instruction that writes to a register that is also written to by an instruction prior to the instruction of the second type, wherein the instruction prior to the instruction of the second type executes in the replay mode and executes prior to the instruction of the second type; and
    an instruction of the third type comprises an instruction that has a data dependency on an instruction that is prior to the instruction of the third type, wherein the instruction that is prior to the instruction of the third type executes in the replay mode.

20. The computing device of claim 12, wherein:

during the replay mode, instructions of a first type are executed, instructions of a second type are executed, and instructions of a third type are executed;

an instruction of the first type comprises an instruction that writes to a register read from by an instruction prior to the instruction of the first type;

an instruction of the second type comprises an instruction that writes to a register that is also written to by an instruction prior to the instruction of the second type, wherein the instruction prior to the instruction of the second type executes in the replay mode and executes prior to the instruction of the second type; and an instruction of the third type comprises an instruction that has a data dependency on an instruction that is prior to the instruction of the third type, wherein the instruction that is prior to the instruction of the third type executes in the replay mode.

* * * * *